United States Patent [19]
Arndt et al.

[11] Patent Number: 5,623,102
[45] Date of Patent: Apr. 22, 1997

[54] THREE WAFER SEMICONDUCTOR PRESSURE-DIFFERENCE SENSOR AND METHOD FOR MANUFACTURE SEPARATING MIDDLE WAFER INTO CONDUCTING DIAPHRAGM AND WEB

[75] Inventors: Frank Arndt; Detlef Houdeau; Moritz von Rauch; Helmut Schlaak, all of Berlin, Germany

[73] Assignee: Siemens Aktiengesellschaft, München, Germany

[21] Appl. No.: 295,692

[22] PCT Filed: Oct. 22, 1992

[86] PCT No.: PCT/DE93/00166

§ 371 Date: Dec. 13, 1994

§ 102(e) Date: Dec. 13, 1994

[87] PCT Pub. No.: WO93/17313

PCT Pub. Date: Sep. 7, 1993

[30] Foreign Application Priority Data

Feb. 28, 1992 [DE] Germany ............ 42 06 675.1

[51] Int. Cl.⁶ .................................................. G01L 13/02
[52] U.S. Cl. ...................... 73/718; 73/706; 29/25.41; 361/283.4
[58] Field of Search ............... 29/25.41; 361/283.3, 361/283.4; 73/718, 717, 724, 706

[56] References Cited

U.S. PATENT DOCUMENTS

| | | | |
|---|---|---|---|
| 4,073,191 | 2/1978 | Saigusa | 361/283.3 X |
| 4,261,086 | 4/1981 | Giachino et al. | 29/25.41 |
| 4,495,820 | 1/1985 | Shimada et al. | 361/283.4 |
| 4,612,812 | 9/1986 | Broden | 361/283.4 X |
| 4,831,492 | 5/1989 | Kuisma | 361/283.4 |
| 4,996,627 | 2/1991 | Zias et al. | 361/283.4 |

FOREIGN PATENT DOCUMENTS

| | | |
|---|---|---|
| 0007596B1 | 2/1980 | European Pat. Off. |
| 0007596A1 | 2/1980 | European Pat. Off. |
| 2827725 | 1/1979 | Germany . |
| 2854262A1 | 6/1979 | Germany . |
| 3236720 | 4/1984 | Germany . |
| 4011734A1 | 4/1990 | Germany . |

*Primary Examiner*—Richard Chilcot
*Assistant Examiner*—Joseph L. Felber
*Attorney, Agent, or Firm*—Kenyon & Kenyon

[57] ABSTRACT

A pressure difference sensor having a semiconductor measuring diaphragm clamped between two bearing parts of insulating material thereby forming two inner chambers is described. Each of the bearing parts holds a flat electrode on its inside. An internal, pressurized, equalization chamber is provided in the clamping region of the pressure difference sensor and extends into both bearing parts around the inner chambers. The equalization chamber compensates for static pressure influences on the accuracy of the measurement of the sensor. A method for producing the sensor is also described.

13 Claims, 3 Drawing Sheets

THREE WAFER SEMICONDUCTOR PRESSURE-DIFFERENCE SENSOR AND METHOD FOR MANUFACTURE SEPARATING MIDDLE WAFER INTO CONDUCTING DIAPHRAGM AND WEB

BACKGROUND OF THE INVENTION

The present invention is related to a method for manufacturing pressure-difference sensors having a semiconductor measurement diaphragm clamped between two bearing parts.

The European Patent Publication No. EP 0 007 596 B1 ("the '596 publication") describes a pressure-difference sensor which has a semiconductor measuring diaphragm clamped, in insulated manner, between two bearing parts thereby forming an inner chamber in each case. Each of the two bearing parts holds a flat electrode on its inside. A first inner chamber is acted on, via a passage opening in the one bearing part, by a first pressure of the pressure difference to be measured. A second inner chamber is acted on by a second pressure of the pressure difference to be measured. The semiconductor measuring diaphragm and the flat electrodes are provided with external connections.

The pressure-difference sensor described in the '596 publication is developed such that its second inner chamber can also be acted on, via a passage opening in the corresponding bearing part, by the second pressure of the pressure difference to be measured. Thus, the pressure-difference sensor described in the '596 publication can detect a pressure difference in the traditional manner. However, the pressure-difference sensor of the '596 publication can also be used as a pressure measuring instrument by not providing a passage opening in the further bearing part, by forming the inner chamber with this further bearing parts and by evacuating the semiconductor measuring diaphragm or by connecting it with the outer air.

The object of the present invention is to provide a method for manufacturing a pressure-difference sensor having a semiconductor measuring diaphragm clamped between two bearing parts, each of the two bearing parts having flat electrodes and for creating the outer connectors for the semiconductor measuring diaphragm and the two flat electrodes in a relatively simple manner.

SUMMARY OF THE INVENTION

To achieve the aforementioned object, the present invention provides a method for the manufacture of pressure-difference sensors having a semiconductor measuring diaphragm clamped between two bearing parts thereby forming an inner chamber in each case. Each of the bearing parts holds a flat electrode on an inside surface. A first inner chamber is adapted to be acted on, via a passage opening in a first bearing part, by a first pressure of the pressure difference to be measured. A second inner chamber is adapted to be acted on by a second pressure of the pressure difference to be measured. The semiconductor measuring diaphragm and the flat electrodes are electrically connected with external connectors.

In the method of the present invention, which provides for the manufacture of pressure-difference sensors with external connectors on a free surface, a first wafer having several bearing parts, each of the bearing parts provided with a flat electrode having its own outer connection, is bonded with a second wafer having several semiconductor measuring diaphragms. A rectangular passage hole is present on one side of each of the semiconductor measuring diaphragms of the second wafer. By partial cuts through the second wafer, extending from the rectangular passage hole at an acute angle to its longitudinal direction, in each case, a web of the second wafer, lying adjacent to the rectangular passage hole, is insulated from the semiconductor measuring diaphragms. A third wafer having a plurality of further bearing parts, each provided with a flat electrode having its own outer connector, is bonded to the second wafer. The pressure-difference sensors are formed by means of separating cuts through the rectangular passage holes in their lengthwise direction and by separating cuts perpendicular thereto.

The method of the present invention advantageously permits several pressure-difference sensors of corresponding development to be produced in parallel. Moreover, the method of the present invention advantageously permits the manufacture the outer connectors for the semiconductor measuring diaphragm and the two flat electrodes to be created in a comparatively simple manner.

A pressure-difference sensor manufactured in accordance with the method of the present invention advantageously contains an inner pressurized equalization chamber in the region of the clamping of the semiconductor measuring diaphragm. The equalization chamber extends within both bearing parts and around the inner chambers.

One advantage of this pressure-difference sensor is that effects of the static pressure in its inner chambers are compensated for in the pressure-difference sensor itself by providing the sensor with a pressurized equalization chamber which extends outward of, and around, the inner chambers. The pressure in the equalization space counteracts the static pressure in the inner chambers of the pressure-difference sensor of the present invention and thereby prevents the initial tension of the semiconductor measuring diaphragm changing as a function of the static pressure in the inner chambers. The measurement error of the pressure-difference sensor of the present invention, which results from the static pressure, is therefore negligibly small. Another advantage of the pressure-difference sensor of the present invention is that it can be arranged within the housing of a pressure-difference measuring instrument without difficulty since outer pressurizing is not necessary for compensation.

The German Patent Publication No. A1 32 36 720 ("the '720 publication) describes providing a pressure-difference sensor with inner pressurized equalization chambers subdivided by the measuring diaphragm into two subchambers each for compensating for a static inner pressure.

With the pressure-difference sensor of the present invention, the equalization space can be pressurized in different manners. It is advantageous, for a simple structural development, to seal off the equalization space from the inner chambers and to permit the equalization space to be acted on by the first pressure or the second pressure via an opening which leads to the outside. This embodiment can be used when a fluid, the pressure of which is to be determined, is not corrosive and is also not very dirty.

In a preferred embodiment of the pressure-difference sensor of the present invention, the equalization space is connected, in a pressure-transmitting manner, with one of the inner chambers. In this embodiment, the equalization space, as in customary manner the inner chambers, is filled with a non-compressible liquid. In the case of pressure-difference sensors of the type described here, the non-compressible liquid is generally provided, not only within the inner chambers, but also in up to two outer separating diaphragms.

The equalization space in the case of the pressure-difference sensor of the present invention can be developed in different manners. For example, the equalization space may be a closed channel which extends around the inner chambers. However, certain difficulties in the manufacture of a sensor developed with this arrangement occur since, in this case, the semiconductor measuring diaphragm must be clamped within the equalization channel.

Subdividing equalization space into a plurality of equalization chambers arranged around the inner chambers appears to be a better arrangement. In this way, clamping the semiconductor measuring diaphragm in customary manner is possible since it remains as a whole in customary manner.

In the pressure-difference sensor of the present invention, connecting an equalization chamber in pressure-transmitting manner, on the one hand, with a filling opening for a non-compressible liquid and, on the other hand, with an inner chamber, and connecting a further equalization chamber in pressure-transmitting manner, on the one hand, with a second filling opening for a non-compressible liquid and, on the other hand, with the second inner chamber is particularly advantageous. In this way, the equalization chambers, as well as the inner chambers, can be filled with the non-compressible liquid from one side in a relatively simple manner.

To simplify the manufacture of the bearing parts with regard to providing the equalization space, in another embodiment of the pressure-difference sensor of the present invention, each bearing part consists of two disks. One of the two disks contributes, with at least one passage hole, to the formation of the equalization space. In this way, the production of blind holes (i.e., not a through hole) can be avoided since the one disk can be produced with only a passage hole (i.e., a through hole or see-through hole), which is relatively simple to produce, and the other disk, which forms the supporting part, can be produced continuously of solid material.

The disks forming the corresponding bearing part can be connected to each other in various ways. It is considered particularly advantageous for the disks to be bonded to each.

DETAILED DESCRIPTION

Figure 1:
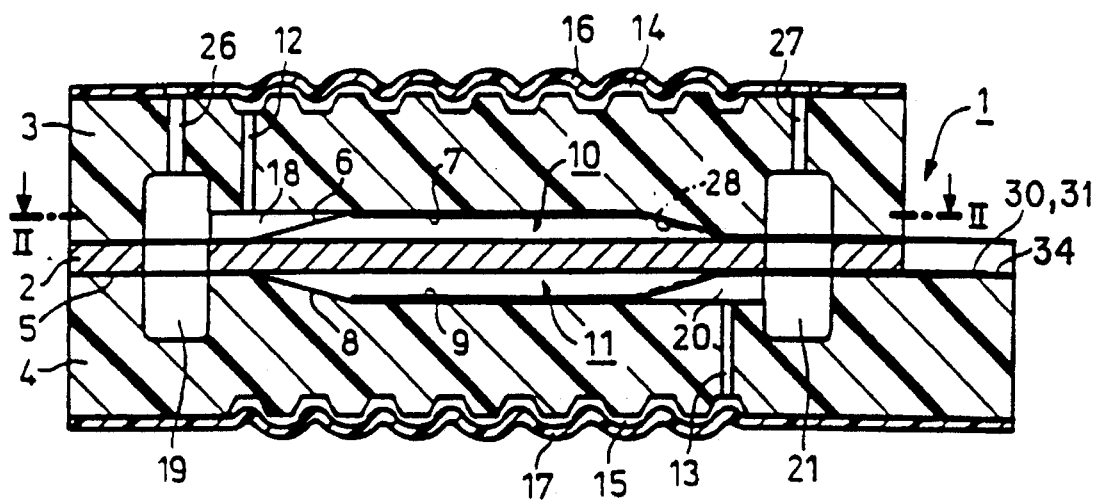
FIG. 1 is a section through an embodiment of the pressure-difference sensor of the present invention along the cut I—I of FIG. 2.

The pressure-difference sensor 1 shown in FIG. 1 has a semiconductor measuring diaphragm 2. The measuring diaphragm 2 is preferably made of silicon which is doped so that it is sufficiently conductive. The semiconductor measuring diaphragm 2 is clamped between an upper bearing part 3 and a lower bearing part 4. Both the upper bearing part 3 and the lower bearing part 4 preferably consist of semiconductor material such as silicon. The region 5 of the semiconductor measuring diaphragm 2 is bonded to the two bearing parts 3 and 4 thereby firmly clamping the measuring diaphragm 2. Bondable glass layers (not shown in the figure) are present between the semiconductor measuring diaphragm 2 and the bearing parts 3 and 4 to insulate them. However, the bearing parts 3 and 4 may also consist of glass or ceramics.

The upper bearing part 3 is provided with an etched recess 6 which holds a flat electrode 7 at its bottom. Similarly, the lower bearing part 4 is provided with a corresponding etched recess 8 which holds a second flat electrode 9 at its bottom. The recesses 6 and 8, along with the semiconductor measuring diaphragm 2, define inner chambers 10 and 11, respectively. The inner chambers 10 and 11 are connected, in each case, by a hole 12 and 13, respectively, in the bearing parts 3 and 4, respectively, with a prechamber 14 and 15, respectively. The prechambers 14 and 15 are located under separating diaphragms 16 and 17, respectively. In addition, the first inner chamber 10 is connected, via a first lateral channel 18, with an equalization chamber 19 (see FIG. 2). Similarly, the second inner chamber 11 is connected, via a second lateral channel 20, with a second equalization chamber 21.

Figure 2:
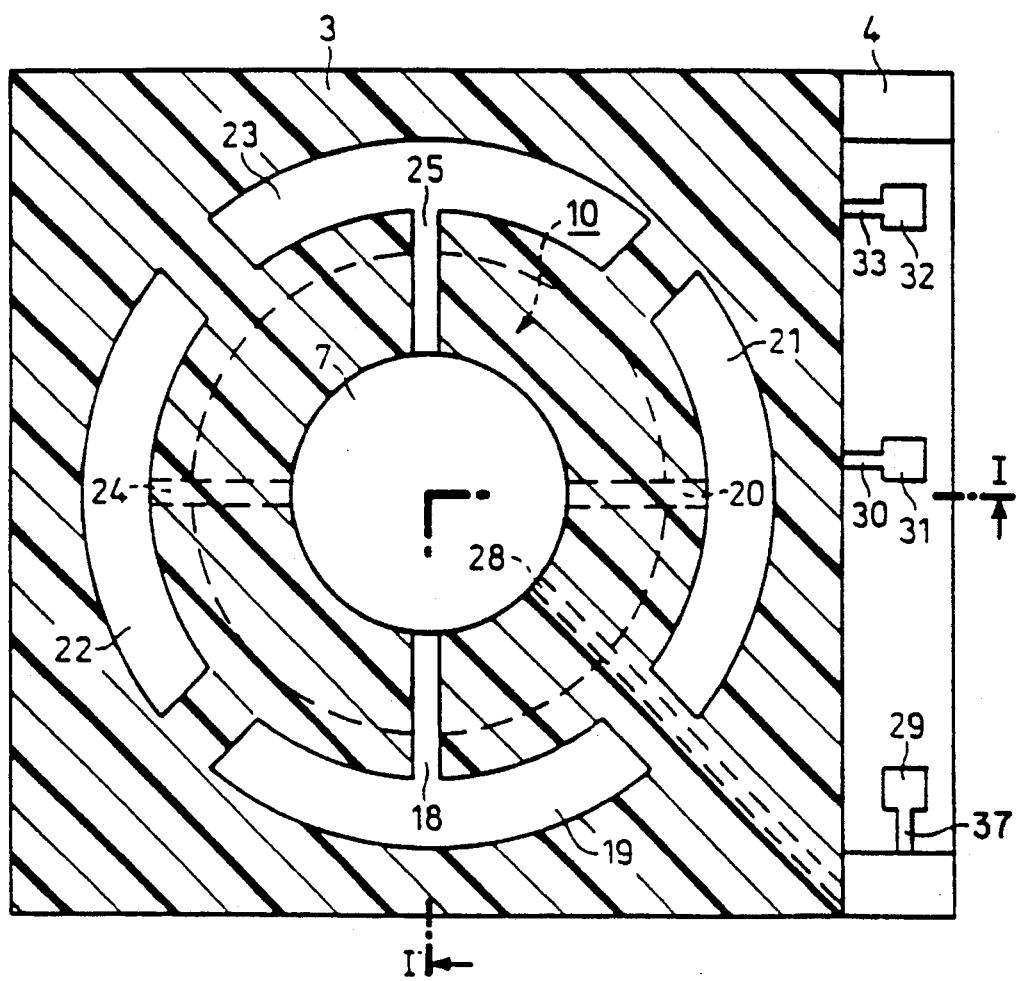
FIG. 2 is a section along the line II—II of the pressure-difference sensor of FIG. 1.

As can further be noted from FIG. 2, additional equalization chambers 22 and 23 are also present. The additional equalization chambers 22 and 23 are also in communication, via additional lateral channels 24 and 25, with the inner chambers 10 and 11, respectively.

The inner space of the pressure-difference sensor shown in FIGS. 1 and 2, between the separating diaphragms 16 and 17, is filled, via filling openings 26 and 27, with a non-compressible liquid. The filling of the inner spaces is done, as shown in particular in FIG. 1, via the equalization chambers 19 and 21. After the inner spaces are filled with the non-compressible liquid, the filling openings 26 and 27 are permanently closed and sealed in a manner not shown in the drawing.

Figure 5:
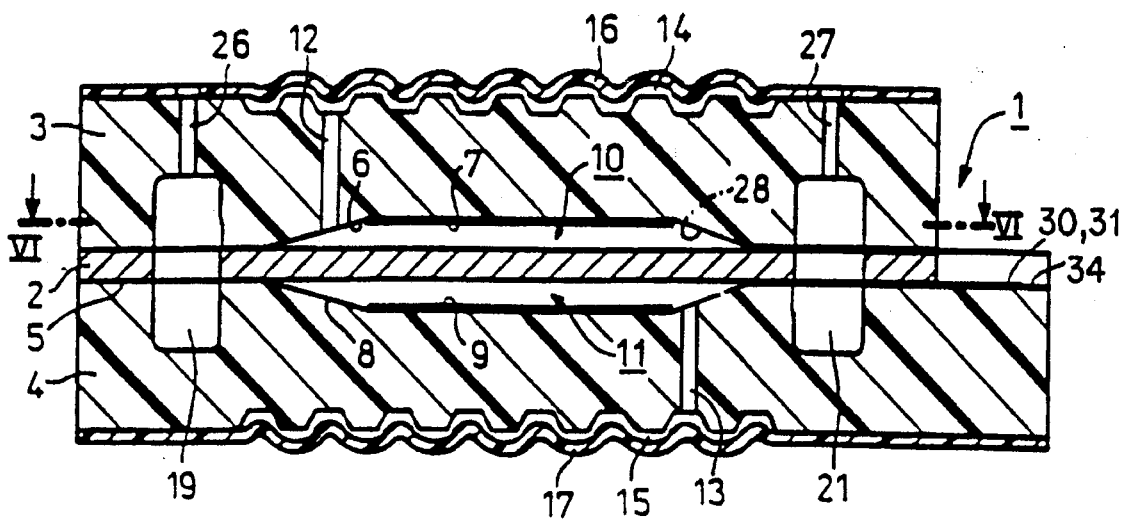
FIG. 5 is a section through another embodiment of the pressure-difference sensor of the present invention along the cut V—V of FIG. 6.
Figure 6:
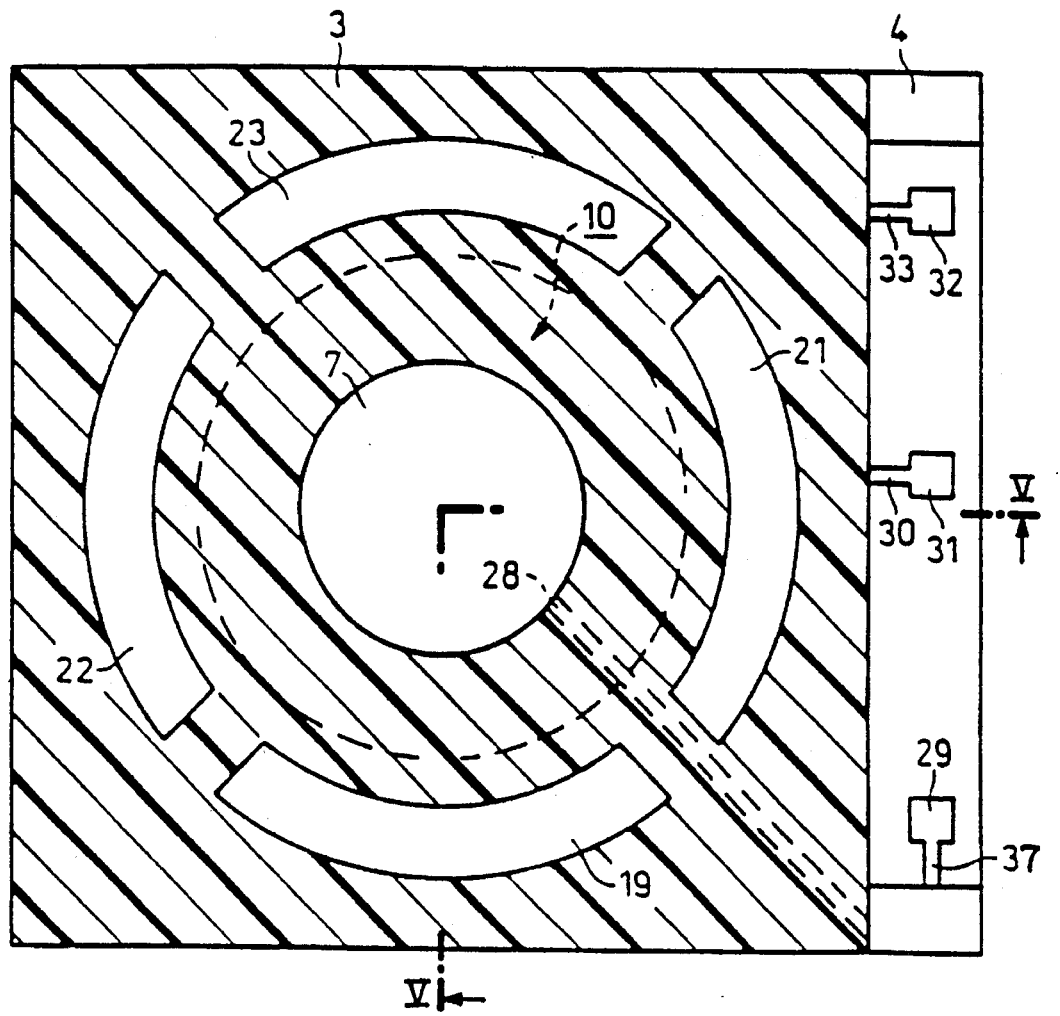
FIG. 6 is a section along the line VI—VI of the pressure-difference sensor of FIG. 5.

With the pressure-difference sensor of the present invention, the equalization space can be pressurized in different manners. For example, as illustrated in FIGS. 5 and 6, it may be advantageous for a simple structural development to seal off the equalization spaces 19, 21, 22 and 23 from the inner chambers 10 and 11 and to permit the equalization space to be acted on by the first pressure or the second pressure via an opening which leads to the outside. This embodiment can be used when a fluid, the pressure of which is to be determined, is not corrosive and is also not very dirty.

The first flat electrode 7 is connected, via a conductive path 28 (only partially shown in FIG. 2), to an outer connector 29. The second flat electrode 9 is connected, via a corresponding conductive path 30, to an outer connector 31. An outer connector 32 having a conductive path 33 for the semiconductor measuring diaphragm 2 is arranged, in the same way as the other connectors 29 and 31, on the free surface 34 of the lower bearing part 4. The electric conductive paths 28 and 30 are either passed to the outside in insulated manner in channels in the bearing parts 3 and 4, or with an insulating coating lying on the surface of the bearing parts 3 and 4.

Figure 3:
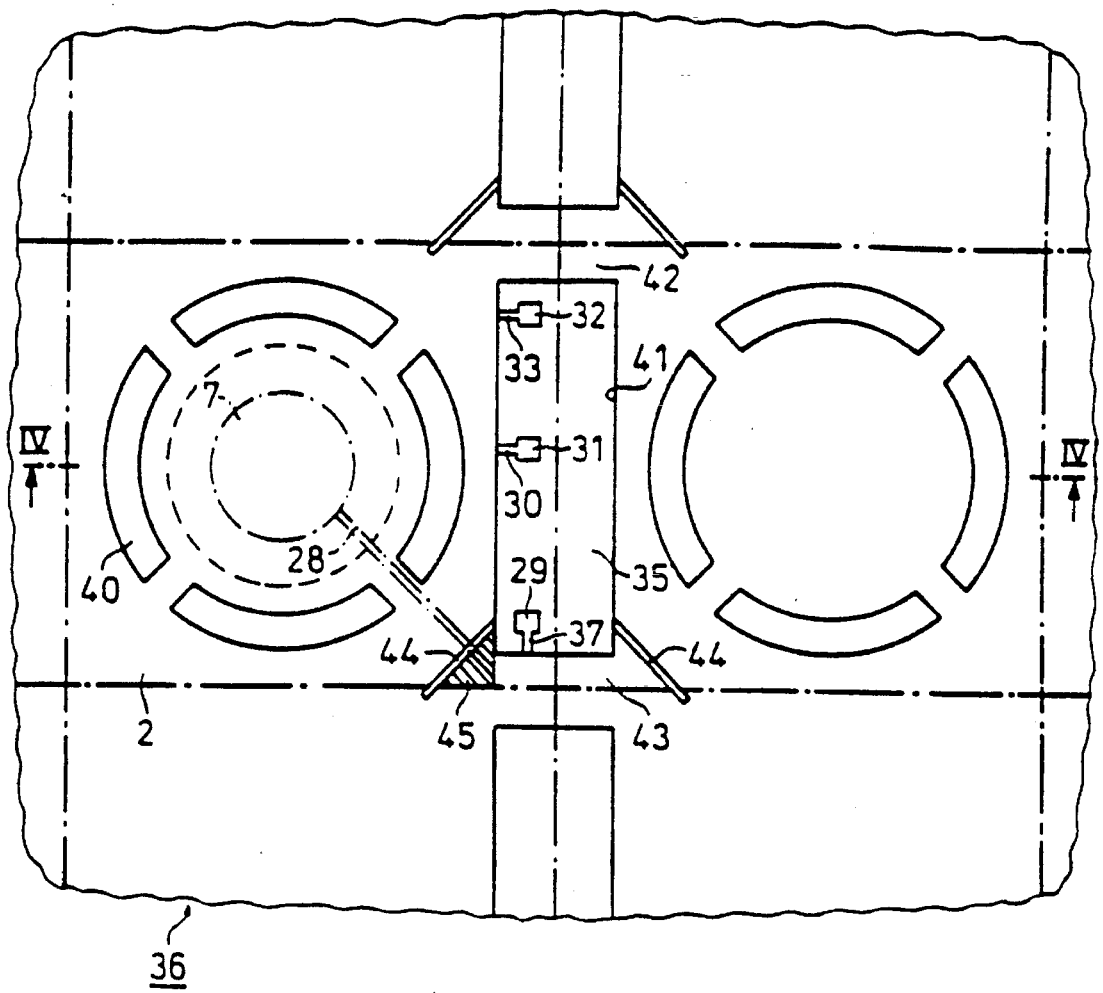
FIG. 3 is a top view of a wafer construction used in the manufacture of the pressure-difference sensor of the present invention.
Figure 4:
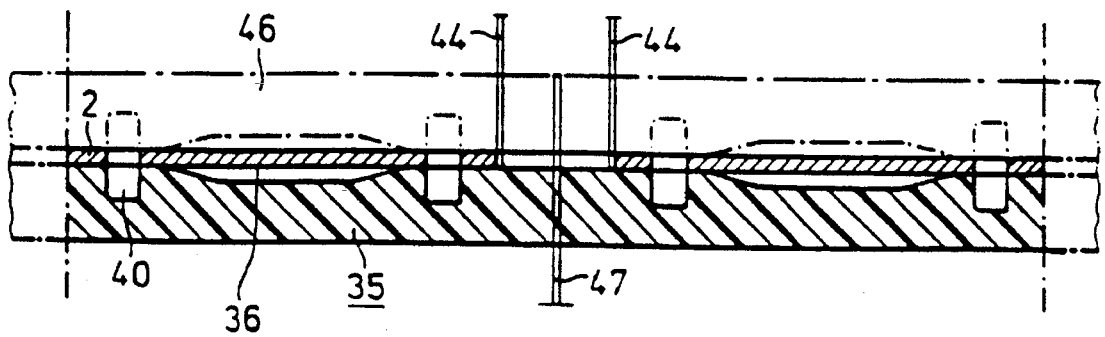
FIG. 4 is a section through the wafer construction of FIG. 3, taken along the line IV—IV.

FIGS. 3 and 4 illustrate the method of manufacturing pressure-difference sensors in accordance with the present invention. FIG. 3 shows a stage of the method of manufacture of the present invention in which a second wafer 36, with semiconductor measuring diaphragms 2 in accordance with FIG. 1, is anodically bonded to a first wafer 35 (see also FIG. 4) having several lower bearing parts 4 in accordance with FIG. 1. The first wafer 35 has been preferably provided with the outer connectors 29, 31 and 32, as well as with the conductive paths 30 and 33 and a connector path 37. The conductive path 30 extends directly to the second flat electrode 9 and the conductive path 33 extends to the semiconductor measuring diaphragm 2. The connector path 37 is electrically connected to a web 45 (described below) during the bonding step. Before it is connected to the first wafer 35, the second wafer 36 is provided, by etching, with passage holes 40 for the equalization chambers 19, 21, 22 and 23, and is also provided with a rectangular passage hole 41 to receive the first wafer 35 as a single disk, such that connecting webs 42 and 43 remain. The dot-dash lines in FIG. 3 indicate the outer contours of the individual pressure-difference sensors at the conclusion of the manufacturing process.

However, at an initial step in the process stage shown in the drawing, only a wafer sandwich consisting of the first and second wafers 35 and 36 is present. In this sandwich partial cuts 44, which extend at an acute angle to the lengthwise direction of the rectangular passage hole 41, are made. The partial cuts 44 are so deep that they completely cut through the second wafer 36. As a result, the webs 43 of the second wafer 36 are separated from the other parts of the second wafer 36 and from the region 45 shown hatched in FIG. 3.

Thereupon, in a further manufacturing step, a third wafer 46 (shown in dash-dot line in FIG. 4) is bonded to the wafer sandwich which has been produced from the first and second wafers 35 and 36. The third wafer 46 has several upper bearing parts 3 in accordance with FIG. 1.

In this way, connector paths 37 to the conductive paths 28 of the upper bearing parts 3, arranged on the third wafer 46, are conducted, in each case, via the webs 43 and the regions 45. The first, second, and third wafers 35, 36, and 46 are then cut, as shown by line 47 of FIG. 4 and by the dot-dashed lines of FIG. 3, such that individual pressure-difference sensors result.

We claim:

1. A method for the manufacture of pressure-difference sensors having a semiconductor measuring diaphragm which is clamped between two bearing parts so that two inner chambers are formed for each pressure-difference sensor, each chamber being defined by the diaphragm and a bearing part, each of the bearing parts holding a flat electrode on its inside, one inner chamber being adapted to be acted on, via a passage opening in one bearing part, by a first pressure of a pressure-difference to be measured and the other inner chamber adapted to be acted on by a second pressure of the pressure difference to be measured, the semiconductor measuring diaphragm being connected with an outer connector and the flat electrodes being connected with outer connectors to produce the pressure-difference sensors having external connectors on a free surface of a bearing part, the method comprising the steps of:

bonding a first wafer having several bearing parts, to a second wafer having a plurality of semiconductor measuring diaphragms, a rectangular passage hole being present in each case on one side of the semiconductor measuring diaphragm, wherein each bearing part of the first wafer has an outer connector for the semiconductor measuring diagram and outer connectors for the electrodes for each pressure-difference sensor, each connector being disposed on a free surface of the first wafer defined by the rectangular passage hole of the second wafer;

partially cutting through said second wafer from the rectangular passage hole at an acute angle to its lengthwise direction thereby electrically insulating a web of the second wafer lying adjacent to the rectangular passage hole, from the semiconductor measuring diaphragm;

bonding a third wafer to the second wafer each third wafer having a plurality of further bearing parts, and each bearing part provided with a flat electrode having a conductive path so that an electrical connection occurs from each electrode in the third wafer via the conductive path and the web to the outer connector; and making separating cuts through the rectangular passage holes, in their lengthwise direction and perpendicular thereto, thereby forming the pressure-difference sensors.

2. The method according to claim 1 wherein an inner pressurized equalization space is provided in a region where the bearing parts clamp the semiconductor measuring diaphragm, the equalization space extends into both bearing parts and around the inner chambers.

3. The method according to claim 2 wherein the equalization space is sealed off from the inner chambers and can be acted on by the first or second pressure via an opening which extends to the outside of the sensor.

4. The method according to claim 2 wherein the equalization space is connected, in pressure-transmitting manner, with one of the inner chambers.

5. The method according to claim 2 wherein the equalization space is divided into a plurality of equalization chambers arranged around the inner chambers.

6. The method according to claim 5 wherein an equalization chamber is connected, in pressure-transmitting manner, on the one hand, with a filling opening for a non-compressible liquid and, on the other hand, with an inner chamber, and a further equalization chamber is connected, in pressure-transmitting manner, on the one hand, with a further filling opening for a non-compressible liquid and, on the other hand, with the other inner chamber.

7. A method for the manufacture of pressure-difference sensors, each having a semiconductor measuring diaphragm clamped between two bearing parts so that two inner chambers are formed, each chamber defined by the diaphragm and a bearing part, each of the bearing parts holding a flat electrode on its inside, a first inner chamber being adapted to be acted on, via a passage opening in a first bearing part, by a first pressure of the pressure-difference to be measured, a second inner chamber adapted to be acted on by a second pressure of the pressure-difference to be measured, the semiconductor measuring diaphragm and the flat electrodes being connected with outer connectors, the method comprising steps of:

a) providing several bearing parts of a first wafer, each bearing part having a flat electrode, and each flat electrode having an external connector on a free surface of a bearing part;

b) bonding a second wafer having a plurality of semiconductor measuring diaphragms, to the first wafer, wherein a rectangular passage hole is present on one side of each of the semiconductor measuring diaphragms;

c) electrically insulating a web of the second wafer, lying adjacent to the rectangular passage hole, from the semiconductor measuring diaphragms by partial cuts through the second wafer which extend from the rectangular passage hole at an acute angle to its lengthwise direction;

d) providing each of a plurality of further bearing parts of a third wafer with a flat electrode, each flat electrode having an outer connector;

e) bonding the third wafer to the second wafer; and f) forming the pressure-difference sensors by separating cuts through the rectangular passage holes in their lengthwise direction and perpendicular thereto.

8. The method according to claim 7 wherein, in the region where the bearing parts clamp the semiconductor measuring diaphragm, there is an inner pressurized equalization space which extends into both bearing parts and around the inner chambers.

9. The method according to claim 8 further comprising a step of:

sealing off the equalization space from the inner chambers and permitting the equalization space to be acted on by the first or second pressure via an opening which extends to the outside of the sensor.

10. The method according to claim 8 further comprising a step of:

connecting the equalization space, in pressure-transmitting manner, with one of the inner chambers.

11. The method according to claim 8 further comprising a step of:

dividing the equalization space into a plurality of equalization chambers which are arranged around the inner chambers.

12. The method according to claim 8 further comprising steps of:

connecting, in a pressure-transmitting manner, an equalization chamber with a filling opening for a non-compressible liquid and with an inner chamber; and connecting, in pressure-transmitting manner, a further equalization chamber with a further filling opening for a non-compressible liquid and with an other inner chamber.

13. A pressure-difference sensor comprising:

a) a semiconductor measuring diaphragm having a peripheral region;

b) a lower bearing part having a first side and a second side, said first side of said lower bearing part having a recessed region having a first thickness and having plateau regions on either side of the recessed region, the plateau regions having a second thickness greater than said first thickness, wherein said peripheral region of said semiconductor measuring diaphragm is bonded, in an electrically insulating manner, to a portion of said plateau regions of said lower bearing part thereby defining a first inner chamber and wherein a portion of the first side of the lower bearing part is a free surface;

c) an upper bearing part having a first side and a second side, said first side of said upper bearing part having a recessed region having a third thickness and having plateau regions on either side of the recessed region of the upper bearing part, the plateau regions of the upper bearing part having a fourth thickness greater than said third thickness, wherein said peripheral region of said semiconductor measuring diaphragm is bonded, in an electrically insulating manner, to said plateau regions of said upper bearing part thereby defining a second inner chamber;

d) a first equalization chamber formed in at least one of the upper and lower bearing parts;

e) a second equalization chamber formed in at least one of the upper and lower bearing parts;

f) a first channel fluidly coupling said first equalization chamber with said first inner chamber;

g) a second channel fluidly coupling said second equalization chamber with said second inner chamber;

h) a first electrode arranged on said recessed region of said lower bearing part;

i) second electrode arranged on said recessed region of said upper bearing part;

j) a first outer connector arranged on said free surface of the first side of said lower bearing part;

k) a second outer connector arranged on said free surface of the first side of said lower bearing part;

l) a first conductive path electrically coupling said first electrode with said first outer connector;

m) a second conductive path electrically coupling said second electrode with said second outer connector, wherein said second conductive path includes a web adjacent to, and insulated from, said semiconductor measuring diaphragm;

n) a third outer connector arranged on said free surface of the first side of said lower bearing part; and o) a third conductive path electrically coupling said semiconductor measuring diaphragm with said third outer connector.

* * * * *